(12) United States Patent
Shimura

(10) Patent No.: US 7,299,691 B2
(45) Date of Patent: Nov. 27, 2007

(54) SENSOR DEVICE FOR TIRE

(75) Inventor: Kazuhiro Shimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 13 days.

(21) Appl. No.: 10/538,301

(22) PCT Filed: Dec. 10, 2003

(86) PCT No.: PCT/JP03/15769

§ 371 (c)(1),
(2), (4) Date: Jun. 9, 2005

(87) PCT Pub. No.: WO2004/052664

PCT Pub. Date: Jun. 24, 2004

(65) Prior Publication Data

US 2006/0243041 A1    Nov. 2, 2006

(30) Foreign Application Priority Data

Dec. 12, 2002 (JP) .............................. 2002-361033

(51) Int. Cl.
*G01M 17/02* (2006.01)
(52) U.S. Cl. .................... 73/146; 73/146.5; 73/146.8
(58) Field of Classification Search ............... 73/146, 73/146.2, 146.3, 146.4, 146.5, 146.8
See application file for complete search history.

(56) References Cited

U.S. PATENT DOCUMENTS 4,531,112 A * 7/1985 Thomas ..................... 340/447

FOREIGN PATENT DOCUMENTS

| JP | 49-108091 U | 9/1974 |
| JP | 55-78512 U | 5/1980 |
| JP | 05-027644 U | 4/1993 |
| JP | 10-508264 A | 8/1998 |
| JP | 11-020427 A | 1/1999 |
| JP | 2001-264202 A | 9/2001 |
| WO | WO-94/07705 A1 | 4/1994 |
| WO | WO-96/06747 A2 | 3/1996 |

OTHER PUBLICATIONS

PCT International Search Report for PCT/JP03/15769 mailed on Apr. 20, 2004.

* cited by examiner

*Primary Examiner*—Andre J. Allen
(74) *Attorney, Agent, or Firm*—Rader, Fishman & Grauer PLLC

(57) ABSTRACT

A sensor device for tire allowing the sensitivity of a traveling state detection switch to be adjusted, wherein tire inside information is detected in the state of the device installed in a tire air chamber and the detected results are transmitted to the outside. The sensor device for tire comprises a movable member swingable outwardly in a tire radial direction by the centrifugal force of the tire when the tire is rotating and a switch detecting a traveling state in conjunction with the movement of the movable member.

8 Claims, 2 Drawing Sheets

SENSOR DEVICE FOR TIRE

TECHNICAL FIELD

The present invention relates to a sensor device for tire which detects tire inside information such as an internal pressure, and more particularly relates to a sensor device for tire which allows sensitivity of a traveling state detection switch to be adjusted.

BACKGROUND ART

In order to monitor tire inside information such as an internal pressure and a temperature, there have been heretofore performed attachment of a sensor device to a well part of a rim, detection of the tire inside information by the sensor device, and transmission of the detected results to a receiver outside the tire by use of radio waves.

Since such a sensor device for tire is driven by a built-in battery, it is desired to lower a frequency of detection or transmission during stopping, in order to extend life of the battery. Thus, a centrifugal switch for detecting a traveling state is provided in the sensor device, and, based on the detected results of the centrifugal switch, an operation of a sensor or a transmitter is switched between a high frequency traveling mode and a low frequency non-traveling mode (for example, Japanese patent application Kohyo publication No. Hei 10(1998)-508264).

However, although the centrifugal switch detects the traveling state when predetermined centrifugal force occurs, the centrifugal force acting on the centrifugal switch changes depending on a wheel structure and an attachment position of the sensor device even at the same traveling speed. In some cases, there is a problem that the switch is not operated until the traveling speed is considerably increased. For example, in attaching the sensor device to the well part of the rim, if a rim diameter is the same and a tire outside diameter is different, the larger the tire outside diameter is, the less the centrifugal force is. Moreover, in attaching the sensor device to the well part of the rim, if the tire outside diameter is the same and the rim diameter is different, the larger the rim diameter is, the more the centrifugal force is. Since the centrifugal switch built into the conventional sensor device has no mechanism to adjust an operating speed, sensitivity thereof cannot be adjusted according to the wheel structure and the attachment position of the sensor device.

SUMMARY OF THE INVENTION

It is an object of the present invention to provide a sensor device for tire which allows sensitivity of a traveling state detection switch to be adjusted.

A sensor device for tire of the present invention to achieve the foregoing object detects tire inside information in a state of the device installed in a tire air chamber and transmits the detected results to the outside. The sensor device for tire includes a movable member swingable outwardly in a tire radial direction by centrifugal force of the tire when the tire is rotating, and a switch which detects a traveling state in conjunction with movement of the movable member.

To be more specific, the sensor device for tire of the present invention, which detects tire inside information in a state of the device installed in a tire air chamber and transmits the detected results to the outside, includes: a sensor which detects the tire inside information; a transmitter which transmits the tire inside information; a control circuit which controls operations of the sensor and the transmitter; a battery to be a power source; a movable member swingable outwardly in a tire radial direction by centrifugal force of the tire when the tire is rotating; and a switch which detects a traveling state in conjunction with movement of the movable member. In the sensor device for tire, the control circuit switches at least one of the operations of the sensor and the transmitter between a traveling mode and a non-traveling mode, based on detected results of the switch.

In the present invention, the switch detects the traveling state in conjunction with the movement of the movable member by the centrifugal force of the tire when the tire is rotating. Thus, based on the detected results of the switch described above, at least one of the operations of the sensor and the transmitter is switched between the high frequency traveling mode and the low frequency non-traveling mode. Consequently, life of the battery can be extended. Moreover, unlike a conventionally used centrifugal switch, sensitivity of a detection switch can be adjusted according to a wheel structure and an attachment position of the sensor device since the movement of the movable member as described above can be controlled externally by use of an appropriate method.

It is preferable that the above-described movable member forms an antenna for transmission. Specifically, the antenna formed of the movable member rises outwardly in the tire radial direction by the centrifugal force of the tire when the tire is rotating. Thus, compared to when the antenna lies down, excellent transmission ability can be achieved. Meanwhile, if the movable member is folded so as not to protrude from the sensor device during stopping, a rim assembly operation will never be inhibited.

As a concrete configuration of the movable member and the switch, for example, the movable member can be supported so as to be swingable around a rotating shaft parallel to a tire axial direction, and the switch can be disposed in the vicinity of a base of the movable member. Moreover, the movable member can be supported so as to be swingable around the rotating shaft parallel to the tire axial direction, and the switch can be disposed in an intermediate position between the base of the movable member and a tip thereof.

It is preferable that the above-described movable member is energized by an elastic body in a direction opposite to a direction of action of the centrifugal force. Thus, it is possible to surely prevent malfunction of the switch in a state of no centrifugal force during stopping. Here, if elastic force to the movable member by the elastic body is set to be changeable, the sensitivity of the detection switch can be adjusted based on the elastic force. In order to change the elastic force to the movable member by the elastic body, the elastic body may be replaced with something else, or a retention state of an elastic body made of a spring or an elastomer may be changed.

A replaceable weight may be attached to the tip of the movable member. In this case, the sensitivity of the detection switch can be adjusted by preparing a plurality of kinds of weights having different degree of weight and changing those weights.

Moreover, it is preferable that the switch is set to be a sealed reed switch which is operated by the magnet, and a magnet is attached to the movable member. Thus, contamination of a contact of the switch is prevented, and the switch can be operated with accuracy for a long period of time.

DESCRIPTION OF THE PREFERRED EMBODIMENTS

With reference to the accompanying drawings, a configuration of the present invention will be described in detail below.

Figure 1:
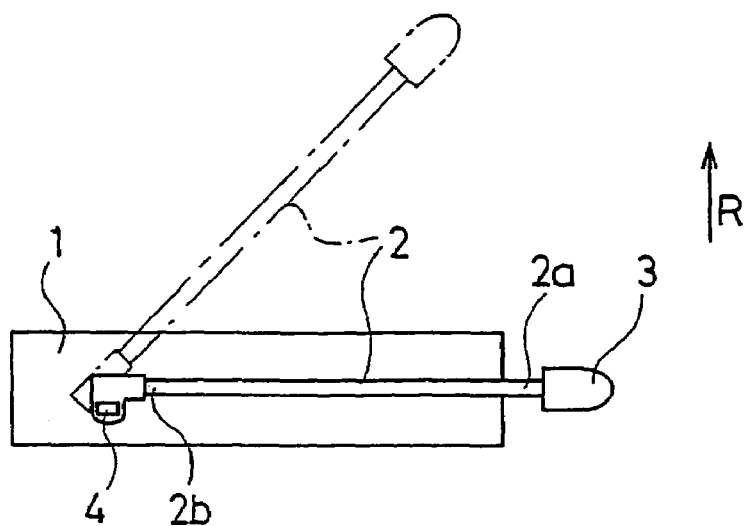
FIG. 1 is a side view showing a sensor device for tire according to a first embodiment of the present invention.
Figure 2:
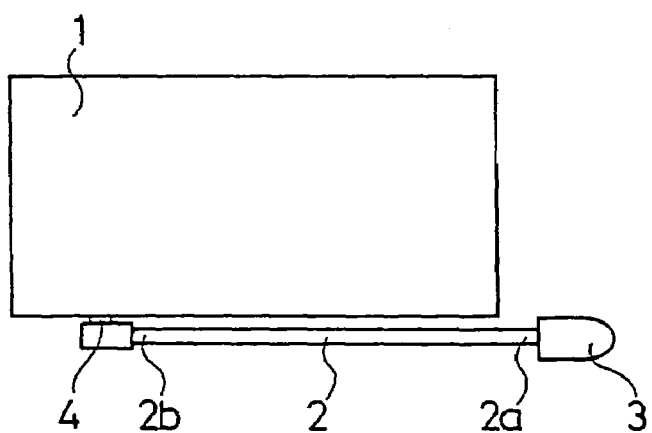
FIG. 2 is a plan view showing the sensor device for tire according to the first embodiment of the present invention.
Figure 3:
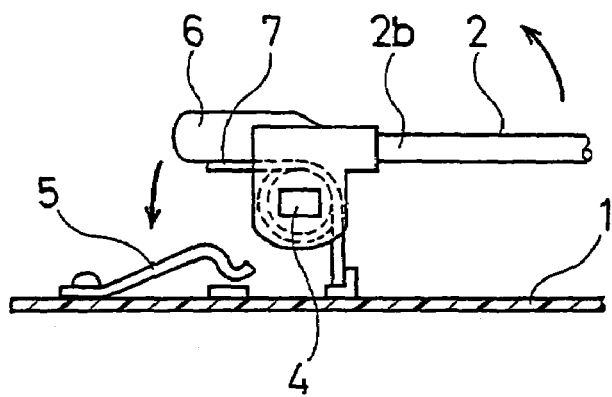
FIG. 3 is a cutout side view showing an enlarged main part of the sensor device for tire according to the first embodiment of the present invention.
Figure 4:
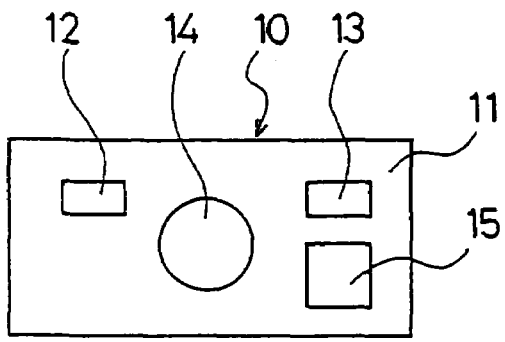
FIG. 4 is a plan view exemplifying a sensor unit according to the present invention.

FIGS. 1 to 3 show a sensor device for tire according to a first embodiment of the present invention. FIG. 4 exemplifies a sensor unit. The sensor device for tire of this embodiment detects tire inside information in a state of the device installed in a tire air chamber, and transmits the detected results to the outside. As shown in FIGS. 1 and 2, the sensor device for tire includes: a case 1 which houses electronic parts; and a rod-shaped movable member 2 which extends outside the case 1, and is swingable outwardly in a tire radial direction (a direction of the arrow R) by centrifugal force of the tire when the tire is rotating. This movable member 2 also functions as an antenna. Moreover, a replaceable weight 3 is attached to a tip 2a of the movable member 2.

As shown in FIG. 3, the movable member 2 is supported so as to be swingable around a rotating shaft 4 parallel to a tire axial direction. On an inner surface of a bottom of the case 1, a switch 5 is provided in the vicinity of a base 2b of the movable member 2. This switch 5 is turned on by allowing a movable terminal to come into contact with a fixed terminal. Meanwhile, a pressing member 6 for pressing the movable terminal of the switch 5 is provided on the rotating shaft 4. An elastic body 7 made of a spring is attached around the rotating shaft 4. This elastic body 7 has one end fixed and the other end abutting on the pressing member 6. Thus, the movable member 2 is energized in a direction opposite to a direction of action of the centrifugal force, that is, toward the bottom of the case 1. Elastic force to the movable member 2 by the elastic body 7 may be not less than gravity on the movable member 2 and the weight 3 during stopping. Accordingly, the movable member 2 is folded during stopping. Thus, malfunction of the switch 5 can be prevented.

In the case 1, a sensor unit 10 as shown in FIG. 4 is housed. This sensor unit 10 includes electronic parts such as a sensor 12, a transmitter 13, a battery 14 and a control circuit 15, all of which are mounted on a printed circuit board 11. As the sensor 12, at least one of a pressure sensor and a temperature sensor can be used. The antenna formed of the movable member 2 is electrically connected to electronic parts included in the transmitter 13. Specifically, the sensor unit 10 measures a tire air pressure by use of the pressure sensor, measures a temperature inside the tire by use of the temperature sensor, and transmits the measured results to the outside of the tire through the antenna formed of the movable member 2.

The control circuit 15 controls operations of the sensor 12 and the transmitter 13. For example, the control circuit 15 can perform the following control. Specifically, in a traveling mode, detection by the sensor 12 is performed at 10-second intervals, and transmission by the transmitter 13 is performed at 1-minute intervals. Meanwhile, in a non-traveling mode, detection by the sensor 12 is performed at 30-minute intervals, and transmission by the transmitter 13 is performed at 60-minute intervals. Accordingly, the control circuit 15 receives detected results of the switch 5, and, based on the detected results, switches at least one of the operations of the sensor 12 and the transmitter 13 between the traveling mode and the non-traveling mode. Specifically, the control circuit 15 selects the traveling mode when the switch 5 detects a traveling state, and selects the non-traveling mode when the switch 5 does not detect the traveling state.

In the above-described sensor device, when the centrifugal force occurs when the tire is rotating, the movable member 2 swings outwardly in the tire radial direction, the pressing member 6 presses the switch 5 in conjunction with the movement of the movable member 2, and the switch 5 detects the traveling state. Thereafter, based on the detected results of the switch 5, the control circuit 15 switches at least one of the operations of the sensor 12 and the transmitter 13 between the high frequency traveling mode and the low frequency non-traveling mode. As a result, unnecessary detection and transmission can be omitted to extend life of the battery.

Moreover, the movement of the movable member 2 can be controlled externally. For example, by replacing the weight 3 attached to the tip 2a of the movable member 2 with another weight having a different degree of weight, a traveling speed at which the switch 5 is operated can be adjusted. Moreover, by changing the elastic force to the movable member 2 by the elastic body 7, the traveling speed at which the switch 5 is operated can be adjusted. Therefore, sensitivity of the switch 5 can be adjusted according to a wheel structure and an attachment position of the sensor device.

For example, in attaching the sensor device to a well part of a rim, if a rim diameter is the same and a tire outside diameter is different, the larger the tire outside diameter is, the less the centrifugal force is. In this case, the weight 3 and the elastic body 7 may be adjusted so as to make it easier for the movable member 2 to swing by the centrifugal force. Moreover, in attaching the sensor device to the well part of the rim, if the tire outside diameter is the same and the rim diameter is different, the larger the rim diameter is, the more the centrifugal force is. In this case, the weight 3 and the elastic body 7 may be set so as to make it difficult for the movable member 2 to swing by the centrifugal force.

Furthermore, since the movable member 2 forms the antenna, the antenna rises outwardly in the tire radial direction by the centrifugal force of the tire when the tire is rotating. Thus, excellent transmission ability can be achieved. Meanwhile, since the movable member 2 is folded by the elastic force of the elastic body 7 during stopping, a rim assembly operation will never be inhibited.

Figure 5:
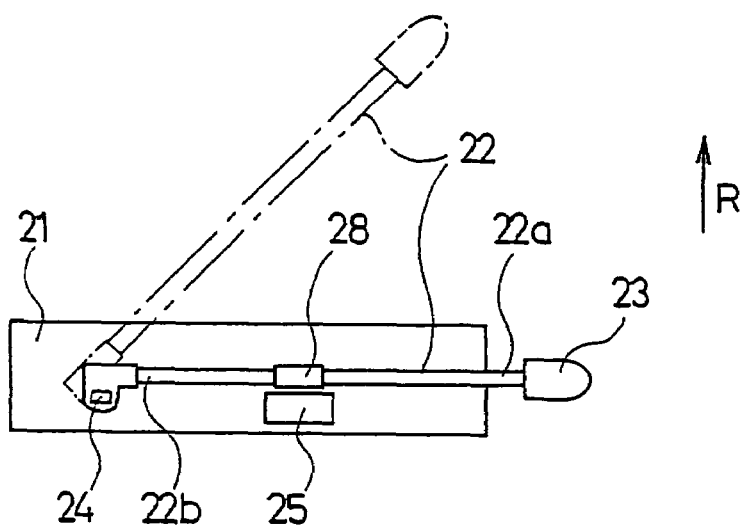
FIG. 5 is a side view showing a sensor device for tire according to a second embodiment of the present invention.
Figure 6:
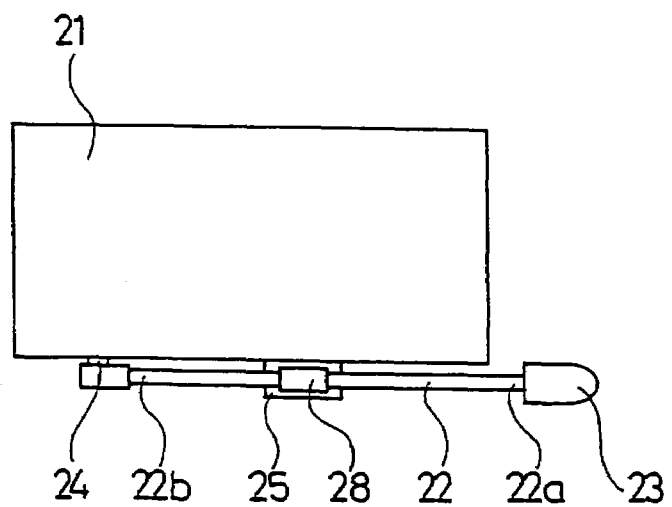
FIG. 6 is a plan view showing the sensor device for tire according to the second embodiment of the present invention.

FIGS. 5 and 6 show a sensor device for tire according to a second embodiment of the present invention. The sensor device for tire of this embodiment detects tire inside information in a state of the device installed in a tire air chamber, and transmits the detected results to the outside. As shown in FIGS. 5 and 6, the sensor device for tire includes: a case 21 which houses electronic parts; and a rod-shaped movable member 22 which extends outside the case 21, and is swingable outwardly in a tire radial direction (a direction of the arrow R) by centrifugal force of the tire when the tire is rotating. This movable member 22 also functions as an antenna. Moreover, a replaceable weight 23 is attached to a tip 22a of the movable member 22. In the case 21, a sensor unit similar to that described above is housed.

The movable member 22 is supported so as to be swingable around a rotating shaft 24 parallel to a tire axial direction. A magnet 28 is attached in an intermediate position between the tip 22a of the movable member 22 and a base 22b thereof. Meanwhile, on an outer surface of the case 21, a switch 25 is provided in a position facing the magnet 28. This switch 25 is a sealed reed switch. Note that an unillustrated elastic body is attached around the rotating shaft 24. Thus, the movable member 22 is energized in a direction opposite to a direction of action of the centrifugal force.

In the above-described sensor device, when the centrifugal force occurs when the tire is rotating, the movable member 22 swings outwardly in the tire radial direction, the magnet 28 operates the switch 25 in conjunction with the movement of the movable member 22, and the switch 25 detects a traveling state. Thereafter, based on the detected results of the switch 25, the control circuit 15 switches at least one of the operations of the sensor 12 and the transmitter 13 between the high frequency traveling mode and the low frequency non-traveling mode. As a result, unnecessary detection and transmission can be omitted to extend life of the battery.

Moreover, the movement of the movable member 22 can be controlled externally, as in the case of the movable member 2 described above. Therefore, sensitivity of the switch 25 can be adjusted according to a wheel structure and an attachment position of the sensor device.

Furthermore, since the movable member 22 forms an antenna, the antenna rises outwardly in the tire radial direction by the centrifugal force of the tire when the tire is rotating. Thus, excellent transmission ability can be achieved. Meanwhile, since the movable member 22 is folded during stopping, a rim assembly operation will never be inhibited.

Furthermore, since the switch 25 is the sealed reed switch operated by the magnet 28, contamination of a contact thereof is prevented, and the switch 25 can be operated with accuracy for a long period of time.

INDUSTRIAL APPLICABILITY

According to the present invention, a sensor device for tire, which detects tire inside information in a state of the device installed in a tire air chamber and transmits the detected results to the outside, includes: a movable member swingable outwardly in a tire radial direction by centrifugal force of the tire when the tire is rotating; and a switch which detects a traveling state in conjunction with movement of the movable member. Thus, by use of the detected results of the switch, at least one of the operations of the sensor and the transmitter is switched between the high frequency traveling mode and the low frequency non-traveling mode. Consequently, battery life can be extended. In addition, sensitivity of a detection switch can be adjusted according to a wheel structure and an attachment position of the sensor device. Moreover, if an antenna for transmission is formed of the above-described movable member, transmission ability can be improved without inhibiting a rim assembly operation.

Although the embodiments of the present invention have been described in detail above, it should be understood that various changes, alternatives, and substitutions can be made without departing from the spirit and scope of the present invention, which are defined by the attached claims.

What is claimed is:

1. A sensor device for tire which detects tire inside information in a state of the device installed in a tire air chamber and transmits the detected results to the outside, comprising:
    a movable member which is swingable outwardly in a tire radial direction by centrifugal force of the tire when the tire is rotating, and forms an antenna for transmission; and
    a switch which detects a traveling state in conjunction with movement of the movable member.

2. A sensor device for tire which detects tire inside information in a state of the device installed in a tire air chamber and transmits the detected results to the outside, comprising:
    a sensor which detects the tire inside information;
    a transmitter which transmits the tire inside information;
    a control circuit which controls operations of the sensor and the transmitter;
    a battery to be a power source;
    a movable member which is swingable outwardly in a tire radial direction by centrifugal force of the tire when the tire is rotating, and forms an antenna for transmission; and
    a switch which detects a traveling state in conjunction with movement of the movable member,
    wherein the control circuit switches at least one of the operations of the sensor and the transmitter between a traveling mode and a non-traveling mode, based on detected results of the switch.

3. The sensor device for tire according to any one of claims 1 and 2, wherein the movable member is supported so as to be swingable around a rotating shaft parallel to a tire axial direction, and the switch is disposed in the vicinity of a base of the movable member.

4. The sensor device for tire according to any one of claims 1 and 2, wherein the movable member is supported so as to be swingable around a rotating shaft parallel to a tire axial direction, and the switch is disposed in an intermediate position between the base of the movable member and a tip thereof.

5. The sensor device for tire according to any one of claims 1 and 2, wherein the movable member is energized by an elastic body in a direction opposite to a direction of action of the centrifugal force.

6. The sensor device for tire according to claim 5, wherein elastic force to the movable member by the elastic body is set to be changeable.

7. The sensor device for tire according to any one of claims 1 and 2, wherein a replaceable weight is attached to the tip of the movable member.

8. The sensor device for tire according to any one of claims 1 and 2, wherein a magnet is attached to the movable member, and the switch is set to be a sealed reed switch which is operated by the magnet.

* * * * *